No. 768,202. PATENTED AUG. 23, 1904.
M. M. SUPPES.
COUPLING FOR ROLLING MILL SHAFTS.
APPLICATION FILED JULY 15, 1903.
NO MODEL.

WITNESSES:

INVENTOR
M. M. Suppes,
BY Geo. H. Parmelee
his ATTORNEY.

No. 768,202.

Patented August 23, 1904.

UNITED STATES PATENT OFFICE.

MAXIMILIAN M. SUPPES, OF ELYRIA, OHIO.

COUPLING FOR ROLLING-MILL SHAFTS.

SPECIFICATION forming part of Letters Patent No. 768,202, dated August 23, 1904.

Application filed July 15, 1903. Serial No. 165,677. (No model.)

*To all whom it may concern:*

Be it known that I, MAXIMILIAN M. SUPPES, of Elyria, in the county of Lorain and State of Ohio, have invented a new and useful Improvement in Couplings for Rolling-Mill Shafts, of which the following is a full, clear, and exact description, reference being had to the accompanying drawings, which form a part of this specification.

My invention has relation to couplings for rolling-mill shafts, and is designed to provide means which will minimize the danger of serious injury to a mill and its engine by reason of the breakage of a leading-spindle. In such cases the breakage usually occurs upon a more or less diagonal line, and before the engine can be stopped one of the broken ends, by riding upon the other broken end, acts in the nature of a cam thereon, causing an endwise or lifting movement, or both, of the shaft-sections, which is likely to cause a more or less complete wreckage of the mill and engine. To guard against accidents of this kind, it has been proposed to use coupling sleeves or spindles so constructed and arranged that in case of breakage one of the broken ends will be pushed freely endwise a sufficient distance to clear the other broken end. Such constructions, however, require means whereby the sleeve or spindle is normally held against such endwise movement, and it has been usual for this purpose to employ wooden and iron stretchers.

According to my present invention I normally hold the spindle against endwise movement by means of one or more stretchers seated in the spindle and having an end bearing against the coupling, said stretchers being of some flexible or yielding material, such as rubber. These stretchers, while sufficiently rigid to hold the parts in proper relation under normal running conditions will under abnormal end pressure, such as occurs in a fracture of the nature above described, flex or yield sufficiently to permit one of the broken ends to be pushed back clear of the other broken end.

Figure 1:
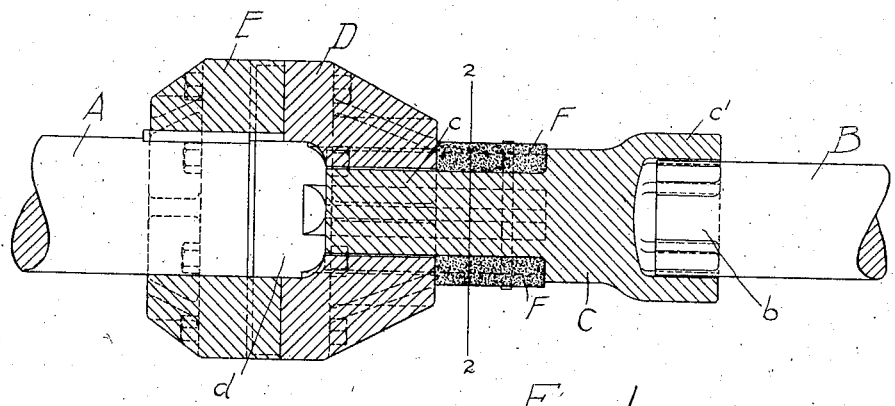
Figure 2:
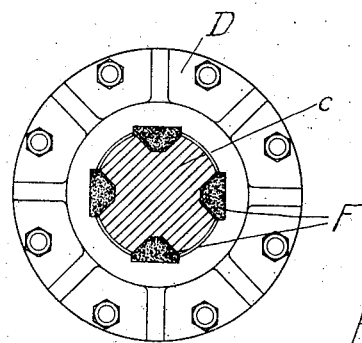
Figure 3:
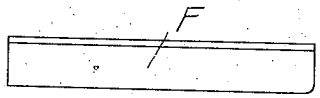

In the accompanying drawings, Figure 1 is a longitudinal section of a coupling embodying my invention; Fig. 2, a section on the line 2 2 of Fig. 1, and Fig. 3 a detail side view of one of the stretchers.

A designates a driving shaft or gudgeon of a rolling-mill; B, a driven shaft or gudgeon; C, a leading-spindle having an exteriorly-fluted end portion $c$ engaging the interiorly-fluted member D and an interiorly-fluted end portion $c'$ which engages the fluted or wabbler end portion $b$ of the shaft B. The coupling member D is detachably bolted or otherwise secured to a coupling member E, which is sesured to the driving shaft or gudgeon A'.

$d$ designates an end clearance-space within the coupling member D to permit endwise movement of the spindle C to facilitate its removal and also to permit the broken end portion of said spindle to be pushed back into said member clear of the other broken portion of the spindle in the event of a fracture.

The spindle and coupling arrangement as thus far described form the subject-matter of another pending application, Serial No. 165,676, filed July 15, 1903.

F designates the stretchers employed for normally holding the spindle C against endwise movement in the coupling member D and in the character and arrangement of which my present invention consists. To seat these stretchers, the flutes in the end portion $c$ of the spindle are extended some distance along the spindle, the stretchers being placed therein, with one end bearing against the end wall of the grooves forming the flutes and the other end bearing against the end face of the coupling member D. These stretchers are constructed from yielding or flexible material, preferably rubber. They are made with sufficient rigidity to stand the normal end pressure and thrusts to which they are subjected in the regular operation of the mill; but in the event of abnormal end pressure, such as would be caused by oblique fracture of the spindle C and one of the fractured ends continuing to revolve and pushing against the other end, they will yield or flex and in some cases fly out of their seats, thereby permitting the fractured end $c$ to be pushed back into the coupling member D clear of the other fractured end.

I do not wish to limit myself to the use of the improved stretchers herein described in connection with the particular construction of coupling herein shown and described, as they may be used with any form of coupling wherein it is desired to hold a member against endwise movement under normal pressure, but to permit such movement under abnormal pressure.

Having thus described my invention, what I claim as new, and desire to secure by Letters Patent, is—

1. In a rolling-mill coupling, the combination with a leading-spindle connecting the driving and the driven shafts, of stretchers arranged to normally prevent endwise movement of the spindle, but sufficiently yielding in character to flex or buckle under abnormal endwise pressure.

2. In a rolling-mill coupling, the combination with a leading-spindle connecting the driving and the driven shafts, of stretchers arranged to normally prevent endwise movement of said spindle, said stretchers being formed of rubber and capable of flexure under abnormal endwise pressure.

3. In rolling-mill driving mechanism, the combination of a driving-shaft, a coupling secured thereto, a leading-spindle engaging said coupling and also coupled to the driven shaft, and flexible stretchers seated in said spindle and having an end bearing at one end against the spindle and at the other end against said coupling.

In testimony whereof I have affixed my signature in presence of two witnesses.

MAXIMILIAN M. SUPPES.

Witnesses:
F. W. WATERMAN,
D. W. LAWRENCE.